L. ADAMS.

Lightning-Rod.

No. 7,939. Reissued Nov. 6, 1877.

WITNESSES

H. Sibley Foulmin

C. L. Everett

INVENTOR

Lawson Adams.

Alexander Stewart

ATTORNEYS

UNITED STATES PATENT OFFICE.

LAWSON ADAMS, OF OMAHA, NEBRASKA.

IMPROVEMENT IN LIGHTNING-RODS.

Specification forming part of Letters Patent No. 193,469, dated July 24, 1877; Reissue No. 7,939, dated November 6, 1877; application filed September 27, 1877.

*To all whom it may concern:*

Figure 1:
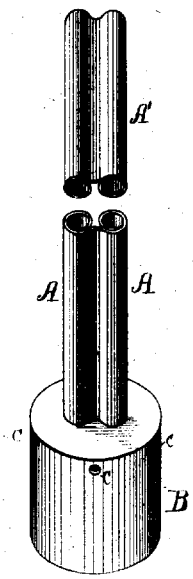
Figure 2:
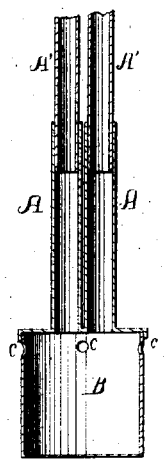

Be it known that I, LAWSON ADAMS, of the city of Omaha, county of Douglas and State of Nebraska, have invented certain new and useful Improvements in Lightning-Rods, and in the method of constructing, using, applying, and operating the same, of which the following is a description thereof, reference being had to the drawings accompanying, with Figures 1 and 2, and the letters of reference therein, all which make part of this specification.

The nature of my invention consists in the construction and arrangement of a lightning rod or rods, water pipe or pipes, and a water tanks or tanks, combined, connected and applied, and operating together, as hereinafter more fully and in detail set forth.

Fig. 1 in the drawing represents a perspective, and Fig. 2 a longitudinal section, of a sufficient portion of my invention to illustrate its construction and operation.

To enable one skilled in the art to make, use, and operate my invention, I describe the same in detail, as follows:

In Fig. 1, A A′ represent sections of the lightning-rod. These sections are formed of copper, the sheets of which they are composed being rolled from the outer edges toward the center in double scroll form, so that two pipes are formed from each sheet, the pipes being in close proximity, as seen.

The several sections are so constructed that they fit snugly together, each lower section being outside the upper section, which enters it, the more readily to convey the water, as hereinafter described, and to make close, strong joints.

The lower section is fitted into and through the top of a water-tank, B, which is made of copper or other suitable material, of size proportionate to the size or number of pipes flowing into it, and placed beneath the earth.

The pipes forming the lightning rod or rods, when put in position upon a building or otherwise arranged and erected for use, are placed with their open side or surface upward and outward, and in that position answer not only the purpose of conductors of electricity, but the further purpose (for which, by their construction and arrangement, they were also intended) of conductors of water received into them during a fall of rain or from any source, to be by them conveyed into the tank placed at the lower end, beneath the earth; the flow of water through said rods or pipes having the effect to increase their powers in conducting and discharging electricity.

The water, as received in said rods or pipes, is carried and conveyed along and down the same to the tank, into which it is emptied. The flow of water in the pipes induces a greater flow of electricity along, through, and over the same, and also serves the purpose of neutralizing the effect and strength of said electric flow, by overcoming, and to a great extent preventing, the friction in said pipes which, without the presence of water, would otherwise occur.

The tank, in connection with the water therein, and the overflow of the same, when full, through the outlets *c c*, serves the purpose of increasing the discharging capacity of the pipes, and the further purpose of arresting, neutralizing, and preventing the further progress, power, and effect of the electricity, and of scattering, dispelling, and rendering harmless the same.

Having thus fully described my invention in detail, what I claim as new, and desire to secure Letters Patent for, is—

1. One or more sections of connected copper pipe, formed from single sheets rolled in double scroll form, as and for the purposes hereinbefore in detail set forth.

2. The sections A A′ of copper pipe, or other suitable material, and the copper (or other metal or material) tank B, constructed in the form, and used in combination, as and for the purposes hereinbefore set forth.

In testimony whereof I have hereunto set my hand the 23d day of August, A. D. 1877.

LAWSON ADAMS.

Witnesses:

PARKE GODWIN,

LEAVITT BURNHAM.